(12) United States Patent
Almgren

(10) Patent No.: US 7,277,701 B2
(45) Date of Patent: Oct. 2, 2007

(54) METHOD FOR AUTOMATIC SELECTION OF CONFIGURATION PROFILE TO MOBILE PHONE

(75) Inventor: Fredrik Almgren, Stockholm (SE)

(73) Assignee: Smarttrust AB, Stockholm (SE)

(*) Notice: Subject to any disclaimer, the term of this patent is extended or adjusted under 35 U.S.C. 154(b) by 18 days.

(21) Appl. No.: 10/542,264

(22) PCT Filed: Dec. 5, 2003

(86) PCT No.: PCT/SE03/01900

§ 371 (c)(1),
(2), (4) Date: Dec. 21, 2005

(87) PCT Pub. No.: WO2004/006664

PCT Pub. Date: Aug. 5, 2004

(65) Prior Publication Data
US 2006/0199613 A1    Sep. 7, 2006

(30) Foreign Application Priority Data
Jan. 20, 2003 (SE) .................... 0300139

(51) Int. Cl.
H04Q 7/20 (2006.01)

(52) U.S. Cl. .................. 455/432.3; 455/557; 455/558

(58) Field of Classification Search ............ 455/432.3, 455/558, 551, 557, 566, 432.1, 552.1, 435.1, 455/433, 456.1, 435.2
See application file for complete search history.

(56) References Cited

U.S. PATENT DOCUMENTS

| | | | | | |
|---|---|---|---|---|---|
| 5,987,325 | A | * | 11/1999 | Tayloe | 455/435.2 |
| 6,463,300 | B1 | * | 10/2002 | Oshima | 455/558 |
| 2002/0142813 | A1 | * | 10/2002 | Cassidy et al. | 455/575 |
| 2003/0186723 | A1 | * | 10/2003 | Kim | 455/558 |
| 2004/0203744 | A1 | * | 10/2004 | Hicks et al. | 455/432.1 |
| 2004/0203768 | A1 | * | 10/2004 | Ylitalo et al. | 455/435.1 |

FOREIGN PATENT DOCUMENTS

SE 523 127 3/2004

* cited by examiner

Primary Examiner—Matthew D. Anderson
Assistant Examiner—Tan Trinh
(74) Attorney, Agent, or Firm—Fasth Law Offices Rolf Fasth

(57) ABSTRACT

The method of the invention for automatic selection of configuration profile to a mobile phone. One or more configuration profiles are predefined in the mobile phone and one configuration profile is defined in a card inserted in the mobile phone. The method has the steps of switching on the mobile phone, comparing the configuration profile of the card with the configuration profile information in the mobile phone, and selecting a configuration profile to the mobile phone as a consequence of the comparison.

8 Claims, 1 Drawing Sheet

METHOD FOR AUTOMATIC SELECTION OF CONFIGURATION PROFILE TO MOBILE PHONE

PRIOR APPLICATIONS

Figure 1:
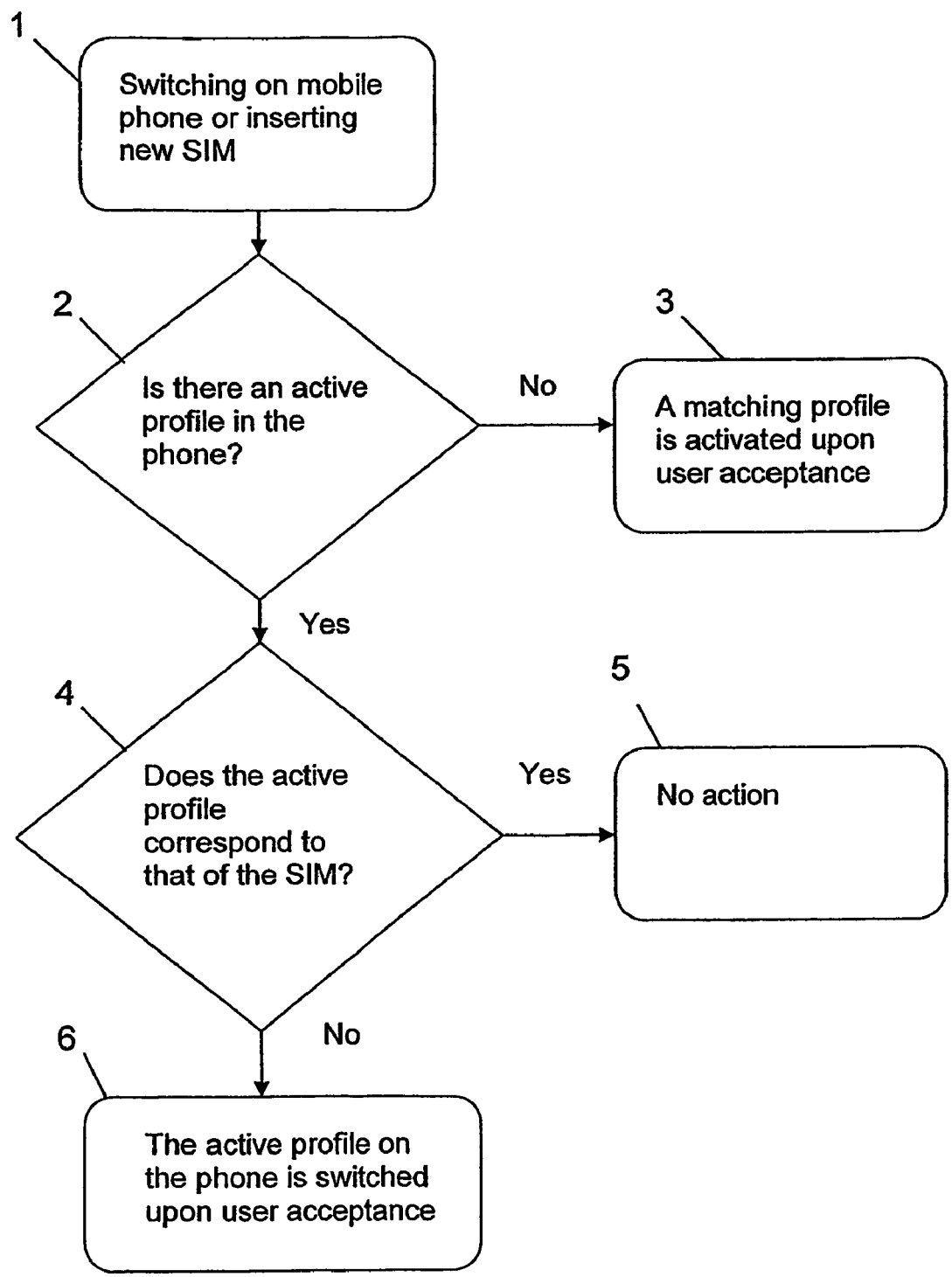

This is a U.S. national phase patent application that claims priority from PCT/SE2003/001900, filed 5 Dec. 2003, that claims priority from Swedish Patent Application No. 0300139-3, filed 20 Jan. 2003.

TECHNICAL FIELD

The invention is concerned with a method for automatic selection of a configuration profile to a mobile phone.

BACKGROUND ART

Modem mobile phones contain a multitude of new technologies and services. For most of these it is necessary for the subscriber to have a correct configuration of the phone to be able to use the new technologies and services. Such a configuration involves setting a number of parameters to correct values. The exact parameters to be set vary depending on the technology. Only for WAP, a number of specific parameters exist, such as IP-addresses and ports for WAP Gateways, disconnection times, connection type preferences, home page addresses, username and password etc. For other technologies, other parameters exist. These parameters can be stored either on the SIM card or in the phone itself.

The structure of the International Mobile Subscriber Identity (IMSI) is defined in the standards. The IMSI is specified in IUT-T recommendation E.212. The Mobile Country Code (MCC) as well as the Mobile Network Code (MNC) and the Mobile Station Identification Number (MSIN) are contained in the IMSI. The MCC, MNC and MSIN together form the IMSI.

The MCC uniquely identifies the country that the IMSI belongs to. The values assigned to MCC have been defined by ITU-T on a global basis to guarantee this uniqueness.

The assignment of values to MNC is the responsibility of the national regulatory authorities. The values of MNC need to be unique for each MCC. Thus the combination of the MNC and MCC forms a globally unique identification for a specific network.

Network operators are then normally responsible for the assignment of the Mobile Station Identification Number (MSIN).

The actual parameters that are to be set are very technical and mean nothing or little to most subscribers. It is therefore difficult for the subscriber to correctly set the parameters. Hence, a lot of subscribers do not have correct settings of these parameters. This means that the subscribers will not be using the services or they might even think that a specific technology is useless since they could never understand how to use it.

To add to the difficulties, as well as the parameter naming, the way for the subscriber to enter the correct configuration parameters vary from phone to phone.

Having incorrect parameter settings often leads to inability to use the technology or services depending on it. Depending on which setting is faulty, the technology might be possible to use but work less than optional. This means that the subscribers will not use the technology and related services. When the subscribers do not have correct settings and thus do not use the new technologies and services, the operators are not making as much money on these services as they could and want.

Modern phones reduce the problem by having pre-defined configuration profiles that collect the parameters into a logical structure of name-value pairs for the parameters and their respective values. Since such a configuration profile already with the technologies available today can contain a large number of parameters, it is reasonable but not necessary to sub-group a configuration set into logical configuration set into a logical page with name—value pairs. Since this still does not make the purpose of the individual parameters obvious for the subscriber, additional functionality is possible. It is possible to predefine configurations sets for different operators and assign names that match the operators. The task of the subscriber is then reduced to selecting the predefined configuration profile that matches his operator or service provider.

Such a configuration profile can often be complemented with a number of predefined services, or links to services, that use the technology. Examples of such pre-defined services could be short-cuts or bookmarks to download portals for ring tones, gaming server addresses, pre-installed applications that communicate over the network etc. Having such predefined services increases the chance of getting the subscriber to start using the new technology.

However, even that final step requires some understanding from the subscriber regarding the services and technologies. The subscriber has to actively search for these profiles and realize that he is interested in this area to make the selection.

THE OBJECT OF THE INVENTION

The object of the invention is to develop a solution, which enables the subscriber to select the right configuration profile in an easy and user friendly way.

SUMMARY OF THE INVENTION

The method of the invention for automatic selection of configuration profile to a mobile phone, in which one or more configuration profiles are predefined in the mobile phone and one configuration profile is defined in a card inserted in the mobile phone, is characterized by the steps of switching on the mobile phone, comparing the configuration profile of the card with the configuration profile information in the mobile phone, and selecting a configuration profile to the mobile phone as a consequence of the comparison.

Said card is preferably a Subscriber Identity Module (SIM) and the preferable embodiments of the invention are presented in the sub claims.

Thus, the invention involves phone based support for automatic selection of configuration profiles. This is a new solution compared with a solution that handles SIM controlled automated settings.

The invention gives a possibility of getting usage of new network technology to increase even though the subscribers do not have any specific technology competence.

The solution of the invention removes almost entirely the need for the subscriber to understand the technology or the configuration principles of the phone itself. When a SIM is inserted in the phone, the phone can detect country and operator codes from the SIM. This information exists in the International Mobile Subscriber Identity (IMSI). The configuration profiles that have been predefined in the phone can then be compared against the data about operator that is provided on the SIM. The idea is to have the country code and operator code internal identifiers for the configuration profiles.

When the subscriber inserts the SIM into the phone, the phone compares the operator information on the SIM with the information in the currently active configuration profile set. If these do not match, the phone asks the user if he wants to activate settings for the current network operator. If so configured, this could be done with or without user configuration.

In this way, the phone gets automatically configured to fit the subscribers network and services.

In the SIM-controlled scenario mentioned, it is the SIM that has been provided by the operator that detects that the user has a new phone. The subscription is assumed to have stayed the same or actually be a new one where this functionality is present. The SIM then initiates a request for downloading correct settings for the specific phone model from the network. The SIM based model can thus better adapt to configuration changes in the network. The basic principle is that that solution makes the SIM detect a new phone. The configuration data would be provided by the operator.

In the solution of the invention, the phone detects a new SIM and chooses a preconfigured configuration profile. Note that the phone would have difficulties to dynamically download new configuration profile data unless provided by the phone manufacturer.

The subscriber can start using the services immediately after purchasing a new phone without having any in-depth knowledge of either one of the technology, the parameters or his new phone. The operator can thus expect a large subscriber base to start using new technologies when new handsets reach the market.

FIGURES

FIG. 1 is a flow scheme of the method of the invention

DETAILED DESCRIPTION

The basic principle is that the phone performs a comparison between the Mobile Country Code (MCC) and the Mobile Network Code (MNC) on the SIM and the corresponding values for the currently active configuration profiles whenever the phone is switched on or when a new SIM card is inserted in the mobile phone (Step 1 of FIG. 1).

The phone then checks (in step 2 of FIG. 1) if there is a currently active configuration profile in the phone.

If the phone has no active configuration profile, the phone compares the MCC+MNC of SIM with all predefined configuration profiles in the phone and if a profile matches, the phone optionally asks the subscriber if he wants to activate it. The user can then be given the option of not having to answer this question again. Upon the acceptance of the user, the matching configuration profile is activated in step 3 of FIG. 1.

If the phone, on the contrary, has an active configuration profile, and if that active profile has the same identity (MCC+MNC) as that on the SIM, which is stated in step 4 of FIG. 1, no action shall be taken (step 5 of FIG. 1).

If, however, the identity of the configuration profile does not match the identity as given by the information on the SIM, the user is asked if he wants to switch active configuration profile, e.g. if he wants to activate a configuration profile in the mobile phone that corresponds to that defined in the card. If the user accepts, the active configuration profile is switched in step 6 of FIG. 1.

The invention claimed is:

1. A method for selection of configuration profile to a mobile phone, whereby one or more configuration profiles are predefined in the mobile phone and one configuration profile is defined in a card inserted in the mobile phone, comprising:
   a) switching on the mobile phone, determining whether a configuration profile in the mobile phone is active,
   b) when the configuration profile in the mobile phone is determined to be active, comparing the configuration profile of the card with the configuration profile in the mobile phone, determining that the configuration profile of the mobile phone is not matching the configuration profile of the card, asking a user to select either the configuration profile of the mobile phone or the configuration profile of the card, and
   c) the user selecting a configuration profile to the mobile phone as a consequence of the comparison.

2. The method of claim 1 wherein in step b), the mobile phone identifies the configuration profile of the card by means of a country code and a network code.

3. The method of claim 2 wherein in step c), no change of configuration profile is made in the phone, if there already is an active predefined configuration profile in the mobile phone that has the same country code and network code as that defined in the card.

4. The method of claim 1 wherein before step b), the current card on the mobile phone is switched to a new one.

5. The method of claim 1 wherein each configuration profile is identified by a country code and an operator code.

6. The method of claim 1 wherein the card is a Subscriber Identity Module (SIM).

7. A method for automatic selection of configuration profile to a mobile phone, whereby one or more configuration profiles are predefined in the mobile phone and one configuration profile is defined in a card inserted in the mobile phone, comprising:
   a) switching on the mobile phone,
   b) comparing the configuration profile of the card with the configuration profile information in the mobile phone, and
   c) selecting a configuration profile to the mobile phone as a consequence of the comparison, and
   in step c) the user of the mobile phone being asked if the user wants to activate a configuration profile in the mobile phone that corresponds to that defined in the card if there is no active configuration profile in the mobile phone and, upon acceptance by the user, the configuration profile is activated in said way.

8. A method for automatic selection of configuration profile to a mobile phone, whereby one or more configuration profiles are predefined in the mobile phone and one configuration profile is defined in a card inserted in the mobile phone, comprising:
   a) switching on the mobile phone,
   b) comparing the configuration profile of the card with the configuration profile information in the mobile phone, and
   c) selecting a configuration profile to the mobile phone as a consequence of the comparison, and
   in step c) the user being asked if the user wants to activate a configuration profile in the mobile phone that corresponds to that defined in the card if the active configuration profile in the mobile phone and that defined in the card do not correspond to each other and, upon acceptance by the user, the configuration profile in the mobile phone is activated in said way.

* * * * *